United States Patent [19]

Su

[11] Patent Number: 4,932,736

[45] Date of Patent: Jun. 12, 1990

[54] HIGH-EXTINCTION 1×2 INTEGRATED OPTICAL SWITCH

[75] Inventor: Shing-Fong Su, Southboro, Mass.

[73] Assignee: GTE Laboratories Incorporated, Waltham, Mass.

[21] Appl. No.: 414,984

[22] Filed: Sep. 29, 1989

[51] Int. Cl.⁵ .............................................. G02B 6/26
[52] U.S. Cl. ............................... 350/96.14; 350/96.15; 350/96.13
[58] Field of Search ............... 350/96.11, 96.12, 96.13, 350/96.14, 96.15

[56] References Cited

U.S. PATENT DOCUMENTS

| | | | |
|---|---|---|---|
| 4,521,069 | 6/1985 | Ikeda | 350/96.13 |
| 4,618,210 | 10/1986 | Kondo | 350/96.14 |
| 4,761,060 | 8/1988 | Sawano | 350/96.15 X |
| 4,773,721 | 9/1988 | Erman et al. | 350/96.13 |
| 4,787,692 | 11/1988 | Spanke | 350/96.13 X |
| 4,818,050 | 4/1989 | Duthie | 350/96.14 |
| 4,820,009 | 4/1989 | Thaniyavarn | 350/96.15 |
| 4,859,019 | 8/1989 | Bevan | 350/96.15 X |

OTHER PUBLICATIONS

R. V. Schmidt and I. P. Kaminow, "Metal Diffused Optical Waveguides in LiNbO₃," Appl. Phys. Lett., vol. 25, pp. 458–460, 1974.

See, for Example, R. C. Alferness, "Guided-Wave Devices for Optical Communications," IEEE J. Quantum Electron., vol. QE017, pp. 946–959, Jun. 1981.

Primary Examiner—William L. Sikes
Assistant Examiner—Akm E. Ullah
Attorney, Agent, or Firm—Victor F. Lohmann, III; James J. Cannon, Jr.

[57] ABSTRACT

A 1×2 integrated optical switch with a high extinction ratio is obtained from the monolithic integration of three integrated waveguide couplers. The waveguide couplers are designed such that the output of the first waveguide coupler is directly coupled to the input of the other two integrated waveguide couplers by an integrated waveguide. Thus, the switch has two cascaded integrated waveguide couplers along each path from the single input to each of the two outputs. Only two pairs of electrodes are required by this design. The extinction ratio of this switch is the sum of the extinction ratios along an input-output path. Since integrated waveguide couplers are bidirectional, this switch can be used as a 2×1 switch by reversing the input and outputs.

4 Claims, 1 Drawing Sheet

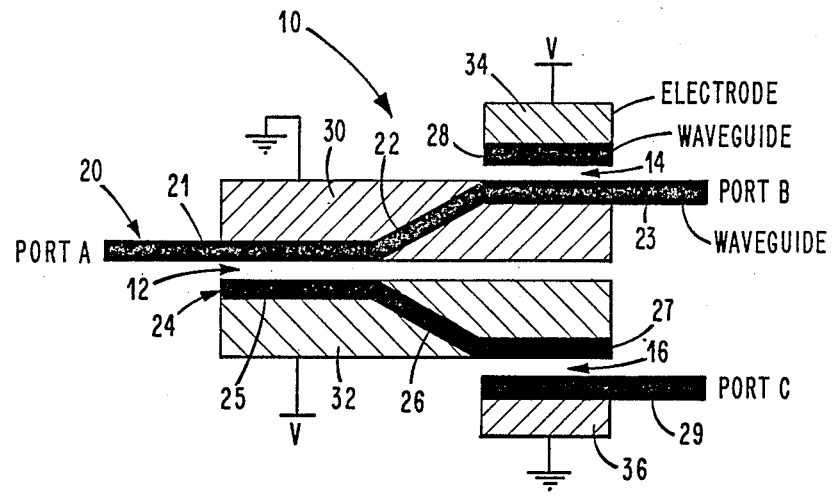

HIGH-EXTINCTION 1×2 INTEGRATED OPTICAL SWITCH

BACKGROUND OF THE INVENTION

This invention pertains generally to the field of integrated optical components for use in fiber optic communications systems, and more particularly it relates to photonic switching. Specifically the invention is a 1×2 integrated optical switch having a very high extinction ratio.

Since metal diffused $LiNbO_3$ waveguides were first fabricated in 1974, $LiNbO_3$-based integrated optical devices, such as modulators and switches, have been extensively studied and the results of such studies have been reported in the literature. This interest in such devices has been based on the expectation that integrated optical devices will play an important role in optical communications systems, especially in optical switching. In optical time-division switching, integrated optical switches are the key elements of optical shift registers and optical time-slot interchangers. In optical space-division switching, integrated optical modulators and switches are the major elements at the crosspoints for all types of switching architectures.

The most important characteristic that an integrated optical switch must have for space-division switching applications is a high extinction ratio. The presently available, conventional 1×2 integrated optical switches have extinction ratios ranging from 15 dB to 25 dB. These low extinction ratios of the presently available integrated optical switches effectively prevents such switches from being integrated into large switch matrices, which matrices are very desirable for optical broadband switching.

SUMMARY OF THE INVENTION

The principal object of the present invention is to provide a 1×2 integrated optical switch having an very high extinction ratio.

Another object of the invention is to provide a 1×2 integrated optical switch which is bidirectional, thus serving also as a 2×1 optical switch.

It is a further object of the present invention to provide a 1×2 integrated optical switch with a high extinction ratio for use in large integrated switch matrices for space-division switching.

It is still a further object of the invention to provide a 1×2 integrated optical switch whose structure and operation is independent of the material from which it is fabricated.

These and other objects of the invention are achieved in the present invention by the provision of a 1×2 integrated optical switch made from the monolithic integration of three integrated waveguide couplers.

In a first aspect of the invention, an embodiment of a 1×2 integrated optical switch having one input port and two output ports is fabricated from three integrated waveguide couplers. The integrated waveguide couplers are designed such that the output of the first integrated waveguide coupler is directly connected to the input of the other two integrated waveguide couplers by an integrated waveguide. Thus, there are effectively two cascaded integrated waveguide couplers along each path from the single input to one of the two outputs. Only two pairs of electrodes are required since each of the three integrated waveguide couplers shares a waveguide with one of the other couplers. By applying or not applying a voltage to the electrodes, the switch can route optical signals from the single input port to one of the two output ports. The extinction ratio of this switch is the sum of the extinction ratios of the two cascaded integrated waveguide couplers along each input-output path.

In a second aspect of the invention, this embodiment of the integrated optical switch of the present invention may also be used as a 2×1 switch because the integrated optical waveguide couplers are bidirectional. The input and output ports are reversed. By applying or not applying a voltage to the electrodes an optical signal can be routed from either of two input ports to a single output port. The extinction ratio is the same in either direction.

BRIEF DESCRIPTION OF THE DRAWING

The FIGURE is a schematic diagram of the preferred embodiment of the high-extinction 1×2/2×1 integrated optical switch of the present invention.

DESCRIPTION OF THE PREFERRED EMBODIMENT

Referring now to the drawing, the FIGURE is a schematic or diagrammatic illustration of the preferred embodiment of a 1×2 or 2×1 integrated optical switch 10 having a high extinction ratio according to the invention.

Considering the use as a 1×2 switch first, the FIGURE shows a port A which serves as the input port to integrated optical switch 10 and two ports B and C which serve as output ports for switch 10. Switch 10 itself comprises a monolithic integration of three integrated waveguide couplers 12, 14, 16, which is designed such that the output of the first integrated waveguide coupler 12 is directly connected to the inputs of the other two 14, 16 by integrated waveguides. A first integrated waveguide 20 has a first end section 21, an intermediate section 22 and a second end section 23. A second integrated waveguide 24 has a first end section 25, an intermediate section 26 and a second end section 27. The first end sections 21, 25 of said first and second integrated waveguides 20 and 24 together with positive electrode 32 and negative electrode 30 form the first of the three integrated waveguide couplers 12. Intermediate section 22 of first integrated waveguide 20 bends and couples an output of first integrated waveguide coupler 12 to second end section 23 of first integrated waveguide 20 at the input to the second integrated waveguide coupler 14, while all sections of first integrated waveguide 20 remain adjacent to negative electrode 30. A third integrated waveguide 28 adjacent to positive electrode 34 together with the second end section 23 of first integrated waveguide 20 adjacent to negative electrode 30 form the second integrated waveguide coupler 14. Output port B is the end of second end section 23 of said first integrated waveguide 20, while waveguide 28 is terminated, becoming an optical absorber. In this way, an output of the first integrated waveguide coupler 12 becomes an input to the second waveguide coupler 14 via intermediate section 22 of waveguide 20. Thus, two cascaded integrated couplers 12, 14 sharing waveguide 20 and electrode 30 form the path from port A to port B.

Likewise, intermediate section 26 of second integrated waveguide 24 bends and couples an output of the first integrated waveguide coupler 12 and the input to the third integrated waveguide coupler 16, while all sections of second integrated waveguide 24 remain adjacent to positive electrode 32. A fourth integrated waveguide 29, adjacent to negative electrode 36, together with second end section 27 of second integrated waveguide 24 adjacent to positive electrode 32, form the third integrated waveguide coupler 16. Output port C is the end of integrated waveguide 29, while waveguide 24 is terminated, becoming an optical absorber. Thus, an output of the first integrated waveguide coupler 12 becomes an input to the third waveguide coupler 16 via intermediate section 26 of integrated waveguide 24. In this way, two cascaded integrated waveguide couplers 12, 16 form the path from port A to port C, sharing a common waveguide 24 and positive electrode 32.

The design of switch 10 also requires only two pairs of electrodes, rather than the three pairs which are usually required for three integrated waveguide couplers.

The operation of switch 10 is very simple. When no voltage is applied to the electrodes 32, 34, switch 10 is in the "cross" or "changeover" state. In this state, optical signals entering at port A will exit switch 10 at port C. When a voltage is applied to electrodes 32, 34, as shown in the FIGURE, switch 10 changes to the "straight-through" or "bar" state. Optical signals entering switch 10 at port A will exit switch 10 at port B. Therefore, by applying or not applying a voltage to electrodes 32, 34, switch 10 can route optical signals from A to B or from A to C respectively.

Since there are effectively two cascaded integrated waveguide couplers along each of the input-output paths A-B, A-C, the extinction ratio of switch 10 in dB is the sum of that of the integrated waveguide couplers along either path. It has been shown in the literature that an individual integrated waveguide coupler can achieve an extinction ratio of 25 dB. Therefore, the extinction ratio of switch 10 can be as high as 50 dB.

Switch 10, as shown in the FIGURE, may also be used as a 2×1 integrated optical switch because the integrated waveguide couplers of which it is composed are bidirectional. Optical signals can travel through the integrated waveguide couplers in either direction without discrimination. When switch 10 is used as a 2×1 switch, port A becomes the output port and ports B and C become the input ports, and the sequence of integrated waveguide couplers is reversed. By applying or not applying a voltage to electrodes 32. 34, switch 10 can route optical signals from port B to port A or from port C to port A, respectively.

The design, structure and operation of switch 10 disclosed herein are independent of the material used for implementing switch 10. Switch 10 can be fabricated using dielectric material, such as $LiNbO_3$, or semiconductor material, such as III–V compounds, as the substrate. Electrodes 30, 32, 34, 36 could be any conductive material that is compatible with the substrate. The integrated waveguide couplers in switch 10 may be directional couplers or cross couplers. A combination of directional couplers and cross couplers may be used in switch 10, provided that the electrode shapes are modified and the proper output ports are selected.

Switch 10 of the present invention, thus, offers many advantages over the prior art optical switches. It can achieve an extinction ratio twice as high as the previous optical switch designs. It requires only two pairs of electrodes. It is bidirectional so that it may be used as a 1×2 or a 2×1 switch. And its structure and operation are independent of the materials used to implement it.

Switch 10 is especially useful for space-division switching because of its high extinction ratio. At a fixed crosstalk or a fixed bit-error-rate, the largest possible switch matrix constructed from switch 10 can be significantly larger than that constructed from conventional 1×2 integrated optical switches. For example, it can be two orders of magnitude larger for crossbar switching architectures, and more than four orders larger for tree-type switching architectures.

I claim:

1. A 1×2 integrated optical switch having a high extinction ratio, comprising:
   a first integrated waveguide coupler having an input port, serving as the input port of said switch, and first and second outputs;
   a second integrated waveguide coupler having an input optically coupled by a waveguide to said first output of said first integrated waveguide coupler and having a single output port, serving as a first output port of said switch;
   a third integrated waveguide coupler having an input optically coupled by a waveguide to said second output of said first integrated waveguide coupler and having a single output port, serving as a second output port of said switch;
   such that said first and said second integrated waveguides are cascaded to form a straight-through path between the input port of said switch and the first output port of said switch;
   such that said first and said third integrated waveguides are cascaded to form a crossover path between the input port of said switch and the second output port of said switch; and
   such that the extinction ratio of a path from the input port of said switch to one of said output ports of said switch is the sum of the extinction ratios of the two cascaded integrated waveguide couplers forming said path.

2. A 2×1 integrated optical switch having a high extinction ratio, comprising:
   a first integrated waveguide coupler having an input port, serving as a first input port of said switch, and an output;
   second integrated waveguide coupler having an input port, serving as a second input port of said switch, and an output;
   a third integrated waveguide coupler having a first input optically coupled by a waveguide to said output of said first integrated waveguide coupler, and having a second input optically coupled by a waveguide to said output of said second integrated waveguide coupler;
   said third integrated waveguide coupler having a single output serving as the output port of said switch;
   such that said first and said third integrated optical waveguides are cascaded to form a straight-through path between the first input port of said switch and the output port of said switch;
   such that said second and said third integrated waveguides are cascaded to form a crossover path between the second input port of said switch and the output port of said switch; and
   such that the extinction ratio of a path from one of said input ports of said switch to said output port of said switch is the sum of the extinction ratios of the two cascaded integrated waveguide couplers forming said path.

3. A 1×2 integrated optical switch having a high extinction ratio, comprising:
a first integrated waveguide having a first end section at a first end, a second end section at a second end, and an intermediate section positioned between said first and second end sections;
a first port of said switch at the beginning of said first end section of said first waveguide;
a second port of said switch at the end of said second end section of said first waveguide;
a first electrode of a first polarity adjacent said first integrated waveguide;
a second integrated waveguide having a first end section at a first end, a second end section at a second end, and an intermediate section between said first and second end sections;
a second electrode of a second polarity, opposite top said first polarity, adjacent said second integrated waveguide;
said first end sections of said first and said second integrated waveguides being positioned in close proximity to each other to enable optical signals to be transferred from one of said waveguides to the other under the control of said first and second electrodes adjacent thereto, thereby constituting a first integrated waveguide coupler;
a third integrated waveguide positioned in close proximity to said second end section of said first integrated waveguide;
a third electrode of said second polarity adjacent said third integrated waveguide;
said second end section of said first integrated waveguide and said third integrated waveguide together with said first and third electrodes positioned adjacent thereto constituting a second integrated waveguide coupler coupled to said first integrated waveguide coupler in cascade by said intermediate section of said first integrated waveguide;
a fourth integrated waveguide positioned in close proximity to said second end section of said second integrated waveguide;
a third port of said switch at one end of said fourth integrated waveguide;
a fourth electrode of said first polarity positioned adjacent said fourth integrated waveguide;
said second end section of said second integrated waveguide and said fourth integrated waveguide together with said second and said fourth electrodes positioned adjacent thereto constituting a third integrated waveguide coupler enabling optical signals to be transferred from one of said waveguides to the other under the control of said second and fourth electrodes;
said third integrated waveguide coupler being coupled to said first integrated waveguide coupler in cascade by said intermediate section of said second integrated waveguide;
such that said first and said second integrated waveguides are cascaded to form a straight-through path between said first port of said switch serving as the input port and said second port serving as the first output port of said switch;
said first and said third integrated waveguides are cascaded to form a crossover path between said first port serving as the input port of said switch and said third port serving as the second output port of said switch; and
such that the extinction ratio of a path from the input port of said switch to one of said output ports of said switch is the sum of the extinction ratios of the two cascaded integrated waveguide couplers forming said path.

4. A 2×1 integrated optical switch having a high extinction ratio, comprising:
a first integrated waveguide having a first end section at a first end, a second end section at a second end, and an intermediate section positioned between said first and second end sections;
a first port of said switch at the beginning of said first end section of said first waveguide;
a first electrode of a first polarity adjacent said first integrated waveguide;
a second integrated waveguide positioned in close proximity to said first end section of said first integrated waveguide;
a second electrode of a second polarity, opposite said first polarity, adjacent said second integrated waveguide;
said first end section of said first integrated waveguide and said second integrated waveguide together with said first and second electrodes positioned adjacent thereto constituting a first integrated waveguide coupler;
a third integrated waveguide having a first end section at a first end, a second end section at a second end, and an intermediate section between said first and second end sections;
a third electrode of said second polarity adjacent said second integrated waveguide;
a fourth integrated waveguide positioned in close proximity to said first end section of said third integrated waveguide;
a second port of said switch at one end of said fourth integrated waveguide;
a fourth electrode of said first polarity positioned adjacent said fourth integrated waveguide;
said first end section of said third integrated waveguide and said fourth integrated waveguide together with said third and said fourth electrodes positioned adjacent thereto constituting a second integrated waveguide coupler enabling optical signals to be transferred from one of said waveguides to the other under the control of said third and fourth electrodes;
said second end sections of said first and said third integrated waveguides being positioned in close proximity to each other to enable optical signals to be transferred from one of said waveguides to the other under the control of said first and third electrodes adjacent thereto, thereby constituting a third integrated waveguide coupler;
a third port of said switch at the opposite end of said second end section of said first waveguide;
said third integrated waveguide coupler being coupled to said first integrated waveguide coupler in cascade by said intermediate section of said first integrated waveguide;
said third integrated waveguide being coupled to said first integrated waveguide coupler in cascade by said intermediate section of said third integrated waveguide;
such that said first and said third integrated waveguides are cascaded to form a straight-through path between said first port of said switch serving as a first input port and said third port serving as the output port of said switch;

said second and said third integrated waveguides are cascaded to form a crossover path between said second port serving as a second input port of said switch and said third port serving as the output port of said switch; and such that the extinction ratio of a path from one of said input ports of said switch to said output port of said switch is the sum of the extinction ratios of the two cascaded integrated waveguide couplers forming said path.

* * * * *